3,600,371
RECOVERY OF POLYETHYLENE FROM SOLUTION
Stanley J. Marwil, Bartlesville, Okla., assignor to
Phillips Petroleum Company
Filed Nov. 12, 1968, Ser. No. 774,726
Int. Cl. C08f 1/88
U.S. Cl. 260—94.9                                6 Claims

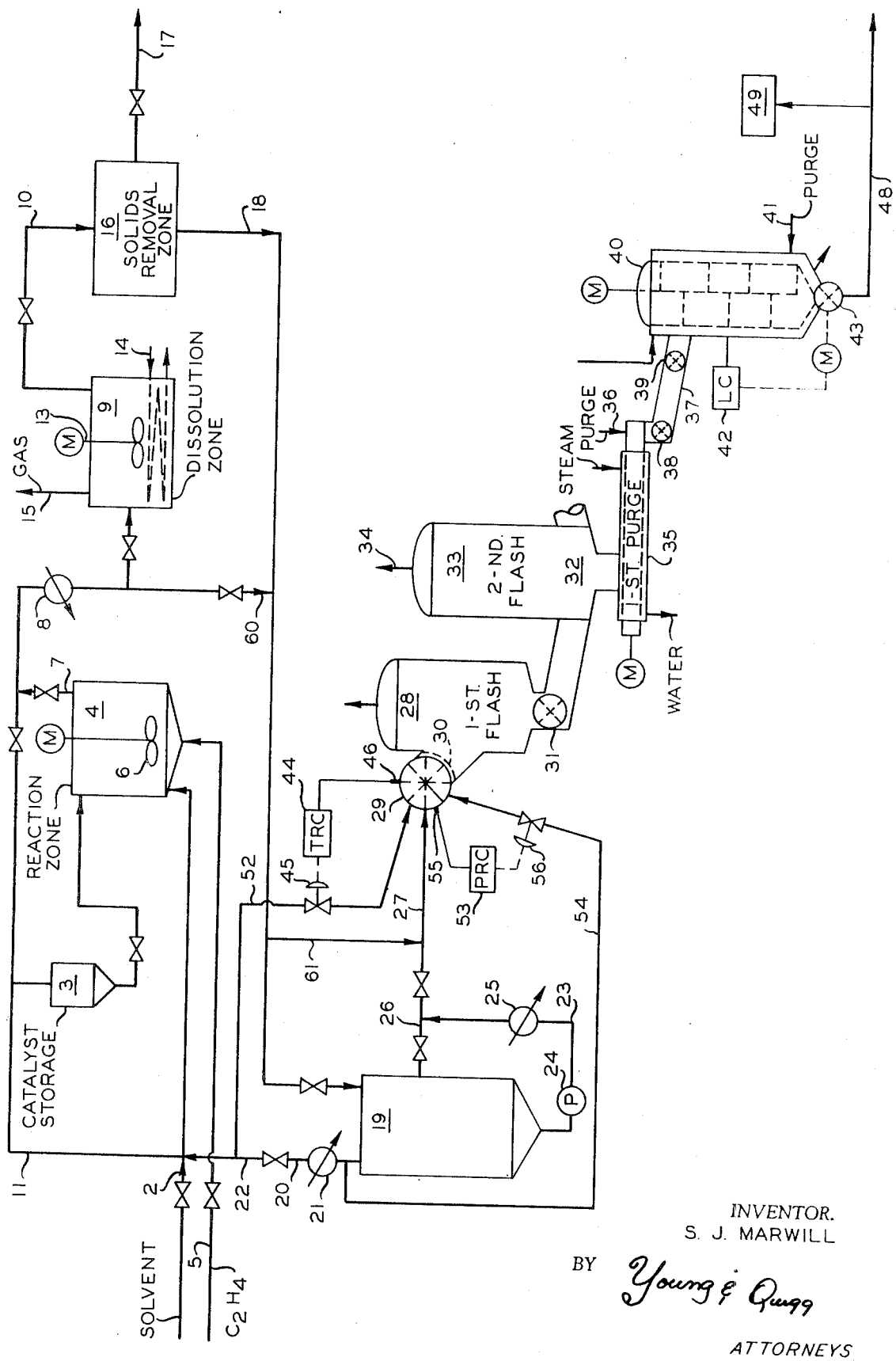

ABSTRACT OF THE DISCLOSURE

In the recovery of a normally solid polymer from a solution thereof by flashing into a low-pressure chamber containing a chopper wherein the solvent vaporizes and the precipitated polymer is chopped into small particles, there is provided the improvement of controlling temperature in the chamber by injection of liquid solvent in response to chamber temperature.

BACKGROUND OF THE INVENTION

This invention relates to the production and recovery of normally solid polymers. In one aspect it relates to a process for the recovery of a normally solid polymer from a solution thereof. In another aspect it relates to a novel method for controlling the temperature in the solution flash zone wherein there is being produced a substantially solvent free solid polymer from a solution thereof in a solvent.

Several different processes are known in the art for the production of normally solid polymers, such as polyethylene, polybutadiene and polystyrene. In many of the known processes, the polymer is initially obtained in the form of a solution in the solvent and must be recovered therefrom. Recovery can be effected by different methods, such as solvent vaporization, which leaves the polymer as a nonvolatile residue, and cooling of the solution to cause precipitation of the polymer, which is subsequently recovered by filtration. Vaporization processes for solvent removal are accompanied by difficulty in removing the last traces of solvent from the polymer. This difficulty arises from the fact that as the solution becomes more and more concentrated, its viscosity increases. Heat transfer is correspondingly retarded and, if proper control is not exercised, the polymer may be thermally decomposed as a result of unduly high residence times in recovery equipment at high localized temperatures. It is highly desirable to free the polymer from the solvent insofar as completely as possible because small amounts, e.g., a few weight percent, of solvent in the polymer forms bubbles upon extrusion of said polymer and consequently cavities when the polymer is heated preparatory to molding.

In addition to the removal of the solvent it is also desirable that the bulk density of the polymer product be controlled. Polymer having a light bulk density has been found to have a tendency to bridge in the system and ultimately results in the plugging of the polymer storage zone. In addition, a more dense polymer can be handled in smaller equipment. For example, doubling the density makes it possible to decrease drying equipment to one half its usual size. In addition to plugging, polymer having irregular bulk density further presents a problem in maintaining a constant feed rate to the polymer extruder utilized for the further processing of the polymer.

This invention is concerned with the recovery of polymer from solution by flash vaporization, i.e., a hot solution of the polymer under considerable pressure is passed into a low pressure chamber where most of the solvent vaporizes leaving the polymer as a solid precipitate. Performance of the flash operation, i.e., the extent of solvent vaporization in the flash chamber and final temperature of the precipitated polymer is dependent on several factors including (1) temperature of the polymer feed solution passed to the flash chamber, (2) polymer concentration in the feed solution, and (3) pressure in the flash chamber. It has been found possible and desirable in recent polymer production developments to increase the polymer concentration in the solution produced in the reactor and subsequently passed to the flash chamber—this is desirable because the quantity of solvent recycle per quantity of polymer produced is greatly reduced. But as the polymer concentration in the solution passed to the flash zone has increased, the temperature within the flash zone and the temperature of the precipitated polymer have increased to the melting point of the polymer. This is highly undesirable as the resulting tacky polymer sticks to the chopper much like taffy candy and production of solid polymer particles with high bulk density becomes impossible.

Control of the temperature in the flash zone by an independent means has thus become necessary in order to operate with the desirably high polymer concentration in the feed solution.

THE INVENTION

It is thus an object of this invention to provide an improved process for the recovery of solid polymer from a solution containing same.

Another object of this invention is to provide a process for controlling the temperature in a polymer recovery zone wherein solid polymer is recovered from a solution containing same.

Other objects, advantages and features of the invention will be apparent to those skilled in the art from the following description, the drawing and the appended claims.

In accordance with the present invention I have discovered that the bulk density of the normally solid polymer being recovered from solution can be controlled by controlling the temperature within the flash chamber in which the solution of polymer is first flashed. More specifically I have discovered that by utilizing liquid solvent to maintain a predetermined temperature within the polymer solution flash chamber there can be obtained from the solution of polymer a solid polymer having a controlled bulk density.

The present invention thus provides an improved process by which polymer having a controlled bulk density can be recovered from a solution thereof by vaporization of the solvent without thermal decomposition of the polymer and the finally recovered polymer contains less than 0.2 weight percent of solvent, often less than 0.02 weight percent, and can be molded or extruded without undue formation of cavities caused by solvent vaporization and without plugging or irregular feed rates to the molding apparatus.

The invention also permits producing and passing solutions containing high polymer concentrations to the polymer recovery step while still recovering a desirably high-bulk density product.

The overall process of the present invention is effected as follows. In a first stage, a solution of polymer in solvent is flashed in a flash-comminution zone maintained under pressure and below the melting point of the polymer so as to remove a major portion of the solvent and obtain dense solid polymer particles. The flash zone has associated therewith a chopping means wherein the solid concentrate is reduced to a predetermined size. In a second stage the resulting sized polymer particles are treated for additional solvent removal in a solvent removal zone which is operated at a lower pressure than the first stage flash-comminution zone. The resulting polymer is thereafter passed to two purge zones in series wherein it is subjected to countercurrent streams of inert purge gas at a temperature below the melting point of the polymer and substantially all of the remaining solvent is removed from the polymer. The resulting, essentially solvent free polymer is recovered as product.

The melting point of the polymer will vary, depending on the physical and chemical nature and origin of the polymer. Polyethylenes ordinarily range in melting point from about 210 to about 260° F. The polyethylenes prepared by the process of Hogan and Banks, U.S. Pat. 2,825,721, ordinarily have melting points in the range of 240 to 260° F. but can have melting points outside this range. It is, however, essential to the recovery of the desired solid polymer to maintain the temperature of the polymer in the first flash-comminution or chopping zone below the melting point of the particular polymer being recovered therein from solution.

The recovery process of this invention is particularly applicable to the recovery of a polymer produced in a process of the type disclosed and claimed in the aforementioned Hogan and Banks patent, wherein an aliphatic 1-olefin having a maximum chain length of 8 carbon atoms and no branching nearer the double bond than the 4-position is subjected to polymerization conditions in the presence of a catalyst comprising chromium oxide, of which a portion of the chromium is initially hexavalent, associated with at least one oxide selected from the group consisting of silica, alumina, zirconia and thoria. The process of this invention is particularly applicable to the recovery of polymer from a solution thereof having a concentration of polymer therein in the range of 15 to 60 percent. One such solution to which the invention is particularly applicable is that of a polyethylene. Polymers so recovered are useful for fabrication into pipe, tubing, electrical insulation and water-resistant wrappings, as more fully set forth in the above cited patent.

In one modification of the overall process of this invention, approximately 25 to 75 percent of the solvent is vaporized in a preliminary concentration zone, from 50 to 99 percent of the remaining solvent is vaporized in the first flash-comminution zone, from 25 to 75 percent of the remaining solvent is removed in the second stage lower pressure solvent removal zone and from 85 to 99.9 percent of the remaining solvent is removed in the final purge zones. Solvent concentration in the product thus obtained from the final purge zone is generally less than 0.2 weight percent.

In one embodiment of this invention wherein a preliminary evaporation is conducted at a temperature in the range of 250 to 350° F. and above the melting point of the polymer and the normal boiling point of the solvent and at a pressure in the range of 0 to 100 p.s.i.g., the resulting concentrate of polymer solution containing from 15 to 60 weight percent polymer is passed to the first stage flash-comminution zone which is maintained at a temperature in the range of 150 to 250° F. and below the melting point of the polymer and at a positive pressure in the range of 15 to 50 p.s.i.a. The resulting polymer, in the form of a sized fluff, is then passed to a second stage solvent removal flash zone which is operated at a temperature in the range of 150 to 250° F. and below the melting point of the polymer and at a pressure in the range of 15 to 25 p.s.i.a. and preferably at least 5 p.s.i. below that of the first stage flash treating zone. The polymer is thereafter passed to a heated, polymer purge zone which is operated at a temperature in the range of 150 to 250° F. and below the melting point of the polymer and at a pressure in the range of 15 to 25 p.s.i.a. The polymer is then passed to a second purge zone preferably operated under the same conditions of temperature and pressure as the first purge zone. The polymer is agitated in the second purge zone and contacted with an inert gas whereby essentially all of the remaining solvent is removed. The resulting polymer fluff having a predetermined bulk density can thereafter be stored and/or further treated in conventional apparatus for the formation of filament, pellets or other desired shape.

In another embodiment of the invention wherein a high-solids reactor is employed to produce the polymer, the preliminary evaporation step is omitted as the polymer solution obtained from the reactor is already at a relatively high concentration of 15 to 60 percent.

The process of this invention can be conducted in evaporators or vacuum flash tanks, the general construction of which is well known in the art. However, certain special features are involved in the construction of the flash apparatus. Since it has been found that the bulk density of the polymer formed by flashing can be controlled responsive to the temperature maintained in the flash zone, control of this temperature and thereby the bulk density of the polymer is provided by novel means as will be described herein.

As shown in the drawing, solvent enters through inlet 2 and is mixed with catalyst supplied from storage zone 3. The catalyst can be, for example, chromium oxide supported on silica. The catalyst particle size is sufficiently small to facilitate the formation of a slurry of catalyst in the solvent. The catalyst-solvent slurry passes into reaction zone 4. The bulk of the solvent is passed to the reactor thru line 2. Ethylene and another olefin such as butene-1 enters the system through inlet 5 and passes into the reaction zone 4 wherein it is mixed with the catalyst and the solvent at a temperature, for example, of approximately 280° F. The solvent can be cyclohexane, octane, or other suitable solvents. The proportions of solvent and ethylene are so adjusted that the concentration of polymer in the reactor does not exceed approximately 15 percent and preferably is in the range from 5 to 10 weight percent. However, when a high-solids reactor is employed as described hereafter, the polymer concentration is generally about 30 to 60 weight percent. The pressure in the reaction zone 4 is sufficient to maintain the solvent substantially in the liquid phase and can be, for example, 500 p.s.i.a. The reaction mixture is maintained in a state of turbulence so that the catalyst is maintained in a substantially uniform suspension or slurry in the reaction mixture. This turbulence can be obtained by jet action of incoming monomer through inlet 5 and/or by the use of a mechanical stirrer indicated by the numeral 6 and driven by motor M. The reaction zone effluent which comprises a mixture of polymer, solvent, and suspended catalyst, together with small amounts of unreacted and/or inert gas, is passed through conduit 7 and heater 8 to dissolution zone 9. Additional solvent can be added, if desired, in order to adjust the concentration to a suitably low value, previously stated, so that the viscosity is not too high for efficient catalyst removal. In dissolution zone 9, the mixture is maintained in a state of turbulence as, for example, by means of a mechanical stirrer 13 driven by a motor M and the temperature is maintained, for example, by the use of heater 14, at from 300 to 400° F., i.e., somewhat higher than that utilized in reaction zone 4. The pressure is sufficient to maintain the solvent substantially in the liquid phase but is preferably lower than that in reaction zone 4 to facilitate the evolution of dissolved gas, including unreacted ethylene, which is vented through outlet 15. Heater 14 is of any suitable design known in the art; for example, it can be a steam coil or an electric immersion heater. Effluent from dissolution zone 9 passes through conduit 10 to solids removal zone 16. The material passed through conduit 10 is a homogeneous solution of substantially all of the polymer in the solvent, which solution contains suspended solid catalyst. Solids removal zone 16 comprises any suitable equipment or combination thereof known in the art for the removal of suspended solids from liquids. For example, it can be a filter or a centrifuge or both. It should be suitable for operation under pressure in order to maintain the solvent in the liquid phase during the filtration. Catalyst removed is withdrawn from the system through conduit 17. The withdrawn catalyst can be regenerated or reactivated, if desired, and recycled to catalyst storage zone 3 by means not shown in the drawing. The solution which has been freed of suspended catalyst solids is passed through conduit 18 to preliminary evaporation zone 19 which is ordinarily in the form of a flash evaporation tank and is operated, for example, at a temperature of 290° F. and a pressure of 33 p.s.i.g. Approximately half of the solvent is evaporated in zone 19, and the evaporated solvent is passed through conduit 20 and condenser 21. The condensed solvent is then returned through conduits 22 and 2. The concentrated residue from evaporation zone 19 is passed through conduit 23, pump 24 and heat exchanger 25 wherein the temperature is raised, for example, to 310° F. Part of the solution is returned through conduit 26 to evaporation zone 19. This mode of operation allows outside heating of the unvaporized material from evaporation zone 19 and is a preferred method of supplying heat to said zone, since it is ordinarily impractical to supply heat efficiently directly to the interior of zone 19.

The remainder of the unvaporized material is passed through conduit 27 to flash comminution zone 28 which is operated, for example, at a temperature of 150 to 250° F., but below the melting point of the polymer and at a pressure of 16 to 50 p.s.i.a. The solution entering flash-comminution zone 28 has a concentration, for example, of 30 to 60 weight percent of polymer in solvent. Comminution zone 29 has therein a knife carrying member with three or more arms, each of which carries a knife blade. Screen 30 is provided of appropriate size openings to retain the solid polymer in zone 28 until the desired polymer particle size as determined by the size of the screen openings is obtained by means of the chopper.

The sized solid polymer particles are then passed by means of rotary valve 31 into a second stage solvent removal zone 32 which is maintained at a temperature in the range of 150 to 250° F., below melting point of the polymer and at a lower pressure than that of zone 28 and generally in the range of 15 to 25 p.s.i.a. Disengaging tank 33 is provided in association with the solvent removal zone 32 and serves to permit liberation of the vapors thru overhead line 34 without entraining any of the polymer. Generally from 25 to 75 percent of the remaining solvent is removed from the polymer fluff in zone 32.

The resulting sized, essentially solvent free polymer material is thereafter passed to a first heated purge zone 35. Inert gas such as nitrogen or ethylene monomer is introduced through line 36 into the zone 35 so as to assist in removing additional solvent from the polymer particles.

After purging in zone 35, the polymer particles are passed through a conduit 37 containing rotating valves 38 and 39 and then into a jacketed vertical, stirred purge column 40. In this column the polymer is again treated countercurrently with an inert purge gas, introduced via line 41, such as nitrogen or superheated stream for substantially complete removal of residual solvent. Purpose of valves 38 and 39 is to prevent intermixing of the different purge gases used in purge zones 35 and 40. The level within zone 40 is controlled by lever controller 41 which is operatively connected to motor 42 and discharge valve 43 and thereby regulates the rate of removal of polymer from the second stage purge zone 40.

In keeping with the present invention the bulk density of the polymer particles discharged through valve 43 is controlled and the production of a solid product in zones 28 is assured by controlling the temperature in comminution zone 29 by means of temperature controller 44 which maintains a predetermined temperature in the chopping zone by manipulating valve 45 in response to the signal provided by temperature sensing element 46 which permits liquid solvent (obtained from any source) to be introduced into the flash chamber through conduit 52. The liquid solvent thus introduced vaporizes in the warm, low pressure zone 29 and thus lowers the temperature of the zone. The set point of controller 44 is regulated so as to keep the temperature in the flash chamber below the melting point of the particular polymer being recovered.

In addition, as a further aspect of this invention, pressure can be controlled in comminution zone 29 by the addition thereto of solvent vapor or some other inert gas from any source thereof such as from zone 19 via line 54 in response to a signal from a pressure control means 53 which is responsive to pressure sensor 55 for maintaining a predetermined pressure in the system by regulating valve 56 which permits introduction of the solvent vapor or inert gas.

The solvent vaporized in the steps according to this invention can be condensed, combined and recovered, for example, for recycling to the polymerization reaction. If desired, a portion of the solvent removed from the flash zone after condensing can be returned to the flash zone to assist in maintaining the temperature therein in keeping with the concept of this invention.

The material from purge zone 40 is thereafter recovered as substantially solvent free polymer fluff having a predetermined bulk density and passed by means of conduit 48 to polymer storage zone 49 or directly to other processing apparatus not shown for further handling. For example the polymer fluff can be introduced into a conventional polymer extruder wherein it is converted to strands of polymer which are thereafter cut to form pellets, rods or the like.

While the invention has been described with a single first flash-comminution chamber 28 in association with said second flash chamber, it is within the scope of the present invention to utilize more than one such flash comminution zone in association with the second flash zone.

The following example is presented to more fully describe the invention, but it is not intended that it should be construed as limiting the invention thereto.

EXAMPLE

Ethylene is fed into stirred reactor 4 in the drawing at the rate of about 3100 pounds per hour together with about 4600 pounds per hour of n-hexane solvent. Activated catalyst consisting essentially of chromium oxide deposited on silica and prepared as described by Hogan and Banks in U.S. Pat. 2,825,721 is passed to the reactor at the rate of 0.50 pound per hour in the form of a slurry in a small amount of n-hexane. Reactor temperature is maintained at 310° F. by means of cooling jackets and interior cooling coils and reactor pressure maintained at about 465 p.s.i.a. A solution containing 40 weight percent polymer is continuously removed from the reactor and passed via pipes 60 and 61 without treatment directly into flash-chopper zone 29. When operating zone 29 at a pressure of 10 to 15 p.s.i.g. in order to achieve nearly complete vaporization of the solvent in the polymer feed solution, it was found in semi-commercial plant tests that the temperature of the precipitated polymer in the zone was so high that it was tacky and fouled the chopper. Operation under these conditions not only did not produce the desirable hard, high-density solid polymer particles but was essentially impossible. By injecting 1700 pounds per hour of liquid n-hexane into chopper zone 29 via pipe 52 it was found that temperatures within the zone were reduced to the extent that hard, high-density solid particles of polymer were produced. The chopper operated under these conditions without becoming fouled with soft polymer. While it was impossible to measure the temperature of the precipitated polymer within zone 29, the solvent vapor temperature within said zone as measured by sensing means 46 was 250° F. and higher without liquid injection and about 195° F. with liquid injection. Temperature of the precipitated polymer was probably higher in both cases, being above its melting point without liquid injection and below its melting point with liquid injection. It was thus determined that application of a 195° F. set point to temperature controller 44 provides optimum performance of the flash-chopper zone, i.e., nearly complete vaporization of the solvent with production of hard, high-density solid polyethylene particles. The particles thus produced in zone 29 pass through sizing screen 30 into chamber 28 wherein solvent vapor is passed overhead through valve 45 and the particles pass through rotary valve 31 into chamber 33. Chamber 28 operates at about the same conditions as zone 29, i.e., about 195° F. and 10 to 15 p.s.i.g. Chamber 33 operates at a lower pressure, i.e., about 0 to 10 p.s.i.g., for the purpose of obtaining additional vaporization of residual liquid solvent. The resulting polyethylene particles with a bulk density of 10 to 15 pounds per foot$^3$ are passed to purge zone 35 consisting of a conveyor dryer wherein they are countercurrently contacted with gaseous ethylene or inert gas for removal of additional solvent. After purging with ethylene the solid polymer particles are passed through two lock valves 38 and 39 into vertical purge column 40 containing a stirring device. The vertical column operates at 223° F. and 18 p.s.i.a. and has 240° F. steam (must be superheated to prevent condensation) or inert gas such as nitrogen passing upward through the column countercurrent to the descending polymer. This additional purging reduces the residual solvent to a negligible concentration. Purpose of the lock valves, previously mentioned, is to prevent mixing of the different purge gases used in the auger-conveyor purge unit and the vertical stirred purge unit. The polymer passes from the stirred unit to storage, thence to conventional extrusion and to sales.

Pressure in zone 29 may be increased by passing solvent vapor through pipe 54 by use of controller 53. It is sometimes desirable to thus increase the pressure in zone 29 in order to increase the bulk density of the polymer particles. It is thus possible to control both pressure and temperature of zone 29 by independent methods and obtain an optimum product.

Although the process of this invention has been described in connection with particular polyethylene processes, it is clearly not limited thereto but is also applicable to the recovery of any normally solid thermoplastic polymer from a solution thereof in a solvent. Thus, the process is also applicable to solutions of polybutadienes, especially hydrogenated polybutadienes as described in U.S. Pat. 2,864,809 by Jones and Moberly, polystyrenes, polypropylene, polyisobutylenes, and polyethylenes produced by processes other than that of the type described herein, as well as to the recovery of halogenated polyethylenes. Also, the process is not limited to the recovery of polymers from saturated hydrocarbon solvents but is applicable wherein solvents such as chloroform, carbon tetrachloride, carbon disulfide and aromatic hydrocarbons and derivatives thereof are used as solvents.

The essence of this invention is that a normally solid thermoplastic polymer of a desired bulk density can be recovered substantially free from a solvent containing same by a process which comprises evaporating a substantial portion of the solvent at a temperature below the melting point of the polymer while simultaneously chopping or comminuting same and wherein the temperature of the zone in which this evaporation and chopping is carried out is controlled by the addition of liquid solvent to same as required.

Reasonable variations and modifications of this invention can be made or followed, in view of the foregoing, without departing from the spirit or scope thereof.

I claim:

1. In a process for recovering a normally solid thermoplastic polymer from a solution thereof in a solvent which process comprises removing a substantial portion of said polymer from said solution while comminuting same in a flash zone maintained under pressure and at a temperature below the melting point of said thermoplastic polymer, the improvement which comprises maintaining the temperature in said flash zone below the melting point of said thermoplastic polymer by introducing additional liquid solvent to said flash zone in response to the measured temperature therein.

2. A process according to claim 1 wherein said thermoplastic polymer is a normally solid polymer obtained by polymerizing at least one 1-olefin having from 2 to 8 carbon atoms per molecule.

3. A process according to claim 1 wherein said additional solvent is provided to said flash zone in response to a signal representative of the temperature differential between the sensed temperature in said chamber and the desired temperature therein which is to be below the melting point of the thermoplastic polymer.

4. A process according to claim 1 wherein said thermoplastic polymer is a polyethylene.

5. A process according to claim 1 wherein the flash zone is operated at a temperature in the range of 150 to 250° F. and at a pressure in the range of 16 to 50 p.s.i.a.

6. A process according to claim 1 wherein a solution containing about 22 weight percent of a polymer of ethylene in n-hexane is introduced to said flash zone which is maintained at a temperature of 195° F. and a pressure in the range of 10 to 15 p.s.i.g.

References Cited

UNITED STATES PATENTS

| 2,964,513 | 12/1960 | Dale | 260—94.9 |
| 3,242,150 | 3/1966 | Scoggin | 260—88.2 |
| 3,457,248 | 7/1969 | Cunningham et al. | 260—93.5 |

JOSEPH L. SCHOFER, Primary Examiner

S. M. LEVIN, Assistant Examiner

U.S. Cl. X.R.

260—93.5, 93.7, 94.7